(12) United States Patent
Edgerly

(10) Patent No.: US 6,409,065 B1
(45) Date of Patent: Jun. 25, 2002

(54) LATCHING HITCH MOUNT CARRIER

(75) Inventor: Jeffrey R. Edgerly, Bristol, CT (US)

(73) Assignee: Industri AB Thule (SE)

( * ) Notice: Subject to any disclaimer, the term of this patent is extended or adjusted under 35 U.S.C. 154(b) by 0 days.

(21) Appl. No.: 09/650,717

(22) Filed: Aug. 30, 2000

Related U.S. Application Data

(63) Continuation of application No. 09/537,784, filed on Mar. 29, 2000.
(60) Provisional application No. 60/127,644, filed on Apr. 2, 1999.

(51) Int. Cl.⁷ .................................................. B60R 9/06
(52) U.S. Cl. ........................................ 224/508; 224/511
(58) Field of Search .............................. 224/508, 510, 224/511, 519, 42.21

(56) References Cited

U.S. PATENT DOCUMENTS 4,971,237 A * 11/1990 Davis ................. 224/42.21 X
5,303,857 A * 4/1994 Hewson .................... 224/42.21
5,370,285 A * 12/1994 Steelman ............. 224/42.21 X
5,469,998 A * 11/1995 Van Dusen et al. ..... 224/508 X

* cited by examiner

*Primary Examiner*—Stephen K. Cronin
*Assistant Examiner*—Maerena W. Brevard
(74) *Attorney, Agent, or Firm*—Kilpatrick Stockton LLP

(57) ABSTRACT

A coupling for attaching a support tube of a sports equipment carrier frame to a hitch mount, securely held to a mounting stinger received in a receiving type hitch of a transporting vehicle. The hitch mount includes a slot for sliding engagement with a lock pin held to the support tube by a bracket. A latch, pivotally mounted in the hitch mount, moves between open and closed positions. Its open position allows the lock pin to move into the slot to establish a suitable position for joining the support tube to the hitch mount. When the latch moves to its closed position, it captures the lock pin to secure the connection between the hitch mount and the support tube.

7 Claims, 5 Drawing Sheets

LATCHING HITCH MOUNT CARRIER

RELATED PATENT APPLICATIONS

This application is a continuation patent application of U.S. application Ser. No. 09/537,784 filed Mar. 29, 2000 and entitled LATCHING HITCH MOUNT CARRIER which claims priority to U.S. Provisional Application No. 60/127,644 filed Apr. 2, 1999 and also entitled LATCHING HITCH MOUNT CARRIER. Said applications in their entirety are hereby expressly incorporated by reference into the present application.

DESCRIPTION

1. Technical Field

The present invention relates generally to carrier frames attached to vehicles used to transport equipment, typically sports equipment, and more specifically to a coupling formed between a carrier frame support tube and a hitch mount that includes a latching mechanism to releasably connect the support tube to the hitch mount.

2. Background Art

Attachment of a carrier frame behind a vehicle to transport equipment, especially sports equipment such as bicycles, is well known. A problem associated with such load carriers is the time involved in properly positioning the normally upright support tube with respect to the balance of the load carrier. The support tube must be designed to accommodate its being configured between a traveling upright configuration and what is usually a tilted configuration in which the support tube is pivoted away from the carrying vehicle to facilitate an operator's access to such parts of the vehicle as the trunk or tail gate of a truck or sport utility vehicle. To accomplish these objectives, most modern rear mount sports equipment load carriers have a number of interconnected modular parts which may be bolted securely together; but when these parts are not secured, they are capable of movement, especially tilting movement, relative to one another. This is especially obvious in hitch mount load carriers in which a primary component is a substantially horizontally oriented extension piece and the tilting upright support is journalled thereto. This method, while effective for producing securable, but moveable connections between the components, typically involves the use of several loose nuts and bolts and may require a similar number of wrenches of varying size for their being tightened and loosened. As a result, operation of such load carriers can become a lesson in dexterity to the operator when trying to correctly align and secure such releasably securable components of the carrier.

As intimated above, the connection of a sports equipment load carrier to a transporting vehicle will usually restrict access to vehicle storage compartments such as the trunk or boot or a tailgated area such as the bed of a pickup truck or sport utility vehicle. For example, a common position for a load carrier frame is at the rear of the automobile connected to a hitch receiver. This arrangement makes access to the trunk difficult, particularly when equipment such as a bicycle has been attached upon the carrier. The need for access to such a storage compartment may occur during a selected break in a journey, or as the result of an emergency. At such times, the removal of sports equipment and possibly portions of the carrier frame will consume a significant amount of time. Provision for temporarily moving the frame and equipment to a non-blocking position markedly reduces the amount of time devoted to obtaining access.

In view of the above described deficiencies associated with the use of known designs for load carriers, and especially those configured as sport equipment carriers for hitch mounting, the present invention has been developed to alleviate the above described drawbacks and provides further benefits to the user which will be appreciated by those skilled in the relevant arts. These enhancements and benefits are described in greater detail hereinbelow with respect to several embodiments of the present invention.

DISCLOSURE OF THE INVENTION

The present invention in its several disclosed embodiments alleviates the drawbacks described above with respect to conventionally designed hitch mount load carriers and incorporates several additionally beneficial features incident thereto. Of particular value is the ease and speed with which the normally upright support tube of the load carrier may be securely coupled to the horizontal connection bar or mounting stinger designed to be releasably inserted into a receiving-type hitch mount on a transporting vehicle. In the illustrated embodiment, an ancillary portion of the load carrier is provided in the form of a second upright extension that is fixed in a substantially upright orientation and is positioned adjacent to the pivotable upright support when that support is in its upright configuration. Releasable connection between the upright support and adjacent extension is accommodated for releasably securing the upright support in an upright orientation. As illustrated, formation of the coupling utilizes a lock pin that is attached to the upright support tube and fits into a slot that is formed in upright extension of the hitch mount. The pin may be releasably retained therein using a lockable and releasable latch that is also located upon the upright extension and configured to pivotally between capture and release configurations with respect to the lock pin. The capture configuration corresponds to a closed position of the latch and the release configuration corresponds to a closed position of the latch. In operation, the locking latch provides freedom for the lock pin to enter or release from the slot in the upright extension portion of the hitch mount to facilitate coupling and uncoupling the support tube. The support tube is hinged to the mounting stinger so that, even when sports equipment is supported upon the load carrier frame, the upright extension post and the support tube may be separated from each other thereby accommodating operator access to otherwise blocked portions of vehicle such as the trunk or tailgate. After engaging the support tube with the upright extension of the hitch mount and moving the locking latch to the closed position, the lock pin is urged up into the closed end of the slot and is held snugly therein by the clamping action of a cammed surface of the latch which pivots on an axis that is transversely alignment relative to the slot.

In at least one exemplary embodiment, the present invention provides a coupling for attaching and controlling an upright support to a mounting stinger having a portion that is received in a hitch receiver mounted upon a transporting vehicle. The coupling includes an upright post having at least one, and preferably two sidewalls that extend therefrom. The sidewall has a slot formed therein extending into the sidewall so that an open end of the slot is established at the edge. The base portion of the upright extension post is securely held to the substantially horizontal mounting stinger that connects to the transporting vehicle. An upright support tube is provided that has a bracket attached thereto. The bracket includes a lock pin configured to slidingly engage into the slot in the sidewall(s) for the purpose of releasably coupling the support tube to the upright extension tube of the hitch mount. A latch is pivotally mounted on the upright extension post and has an open position for allowing the lock pin to enter the open end of the slot at the edge of the sidewall and a closed position for preventing release of the lock pin from the slot. An operator releasable coupling is thereby accommodated between the substantially stationary portions of the hitch mount which are secured upon the transporting vehicle and the pivotally attached support tube that has the lock pin incorporated thereupon for engagement within the slot for capture by the latch when in the closed position.

The beneficial effects described above apply generally to the exemplary devices and mechanisms disclosed herein of the latching hitch mount carrier of the invention. The specific structures through which these benefits are delivered will described in detail hereinbelow.

BRIEF DESCRIPTION OF THE DRAWINGS

The invention will now be described in greater detail in the following way of example only and with reference to the attached drawings, in which.

MODE(S) FOR CARRYING OUT THE INVENTION

As required, detailed embodiments of the present invention are disclosed herein; however, it is to be understood that the disclosed embodiments are merely exemplary of the invention that may be embodied in various and alternative forms. The figures are not necessarily to scale, some features may be exaggerated or minimized to show details of particular components. Therefore, specific structural and functional details disclosed herein are not to be interpreted as limiting, but merely as a basis for the claims and as a representative basis for teaching one skilled in the art to variously employ the present invention.

Furthermore, elements may be recited as being "coupled"; this terminology's use contemplates elements being connected together in such a way that there may be other components interstitially located between the specified elements, and that the elements so specified may be connected in fixed or movable relation one to the other.

Figure 1:
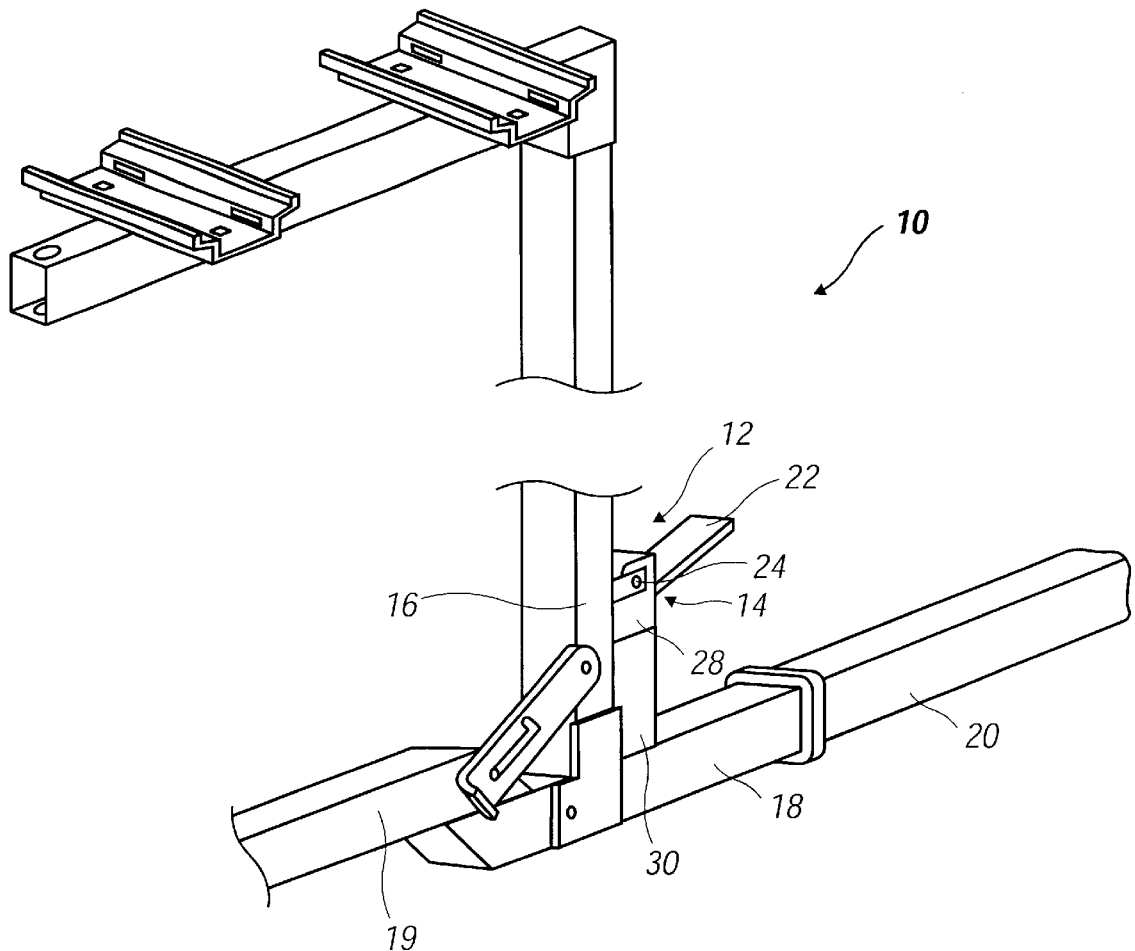
FIG. 1 is a perspective view showing the latching hitch mount carrier of the invention positioned in a receiving type hitch.

Referring now to the Figures and using like reference numerals to identify like parts throughout the several views, FIG. 1 shows a perspective view of a load carrier frame 10, suitable for carrying bicycles, and a coupling 12 that uses the latching arrangement 14 disclosed hereinbelow in greater detail. The coupling 12 includes an upright support tube 16 having an upper end to which a sports rack for bicycles is attached. The upright components of the carrier are attached to a substantially horizontal connection or mounting stinger 18 received in a receiving-type hitch 20 suitably incorporated upon a vehicle for transport. Formation of the coupling 12 involves the use of a single, simple action of moving a latch 22 from an open position, also referred to herein as a free configuration, to a closed position or latched configuration. The latch 22 itself forms a part of a latching mechanism 14. With the latch in its open position, a lock pin 24, secured to the support tube 16 by a bracket 26, may slide into a slot 32 in a sidewall 28 of a base or upright extension post 30 of the latching arrangement 14. This action is a preliminary stage for joining the support tube 16 to the upright extension post 30. A secure connection between the support tube 16 and the upright extension post 30, is established upon moving the latch 22 to its closed position wherein it captures the lock pin 24 preventing the pin's 24 release from the slot in the sidewall 28. The formation of this secure connection requires only one, convenient and simple action of raising the latch 22 the short distance from the open position in which the lock pin 24 is released to the closed position where the latch 22 captures and holds the lock pin 24 inside the latching hitch mount 14.

Figure 2:
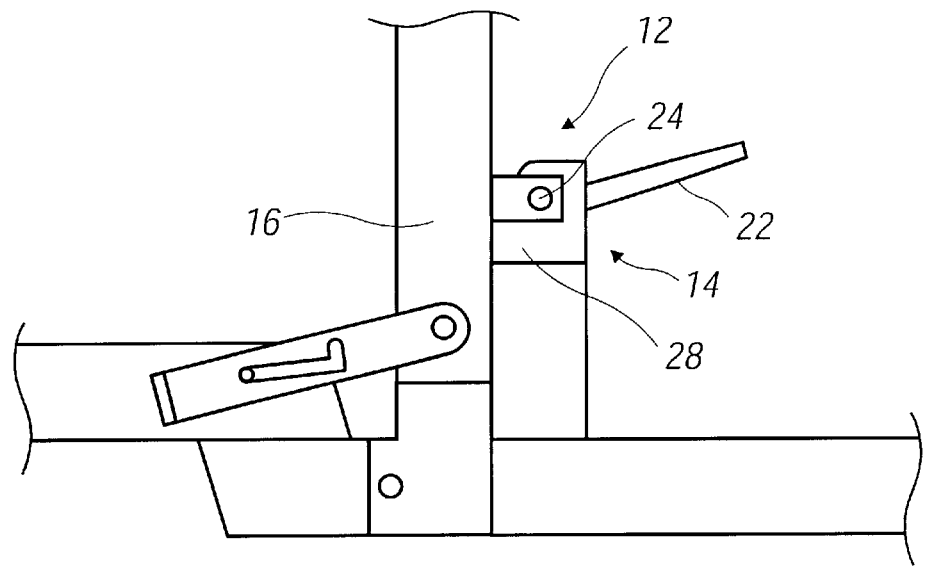
FIG. 2 is a side elevational view of a latching hitch mount in its latched position.
Figure 3:
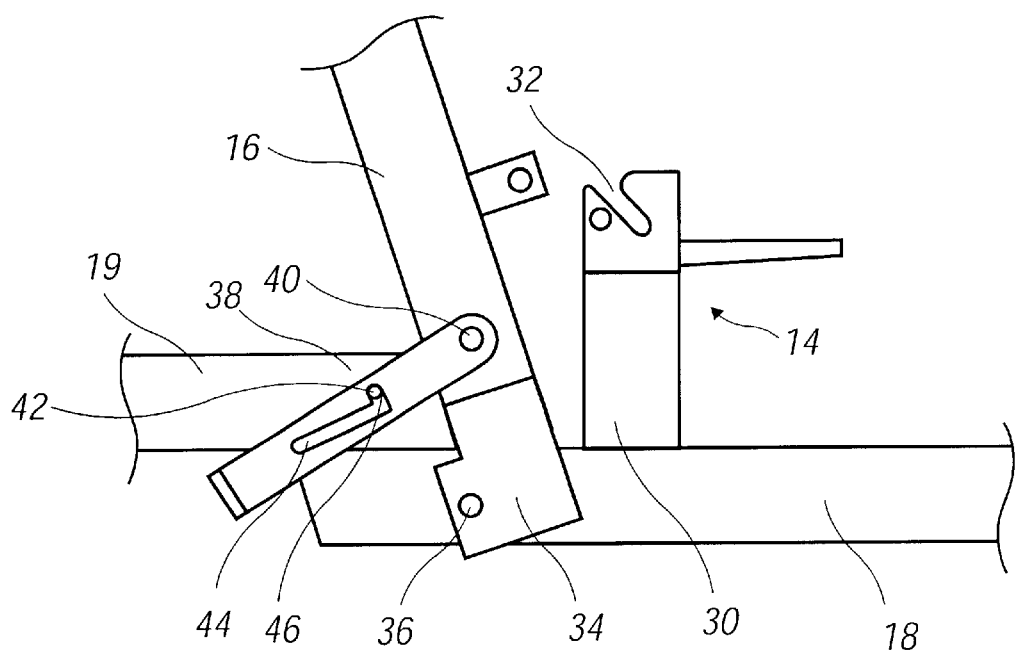
FIG. 3 is a side elevational view showing a latching hitch mount of the invention in its open position with frame components separated.

FIG. 2 is a side elevation of a securing coupling 12 according to the invention with the latch 22 in the closed position. The support tube 16 includes several attachments that facilitate controlled separation of the support tube 16 from the latching hitch mount 14 when the latch 22 opens to release the lock pin 24 from the slot in the sidewall 28. FIG. 3 demonstrates the slot 32 in greater detail by showing the support tube 16 separated from the upright extension post 30. In its tilted or angled free configuration, the support tube 16 pivots away from the latching arrangement 14. The pivoting action centers around a hinge plate 34 held to the mounting stinger 18 by a hinge bolt 36. A connecting arm 38 between the support tube 16 and an extension tube 19 rotates about a hub 40 attached to the support tube 16 as the separation increases between the latching hitch mount 14 and the support bar 16. With the increasing separation, a guide post 42, mounted on the extension tube 19, changes its position relative to a channel 44 formed in the wall of the connecting arm 38. The channel includes a retention slot 46 which releasably locks on to the guide post 42 after the support tube 16 reaches approximately the point of maximum retraction from the latching arrangement 14. Inclusion of the retention slot 46 in the channel 44 provides a temporary locking device which gives added safety, limiting movement of the support tube 16 after its release from the latching arrangement 14. Re-connection of the support bar 16 to the latching arrangement 14 results from lifting the connecting arm 38 to allow the guide post 42 to clear the retention slot 46 and to reside in the channel 44 which may then move past the guide post 42 while raising the support arm 16 to make the desired connection.

Figure 6:
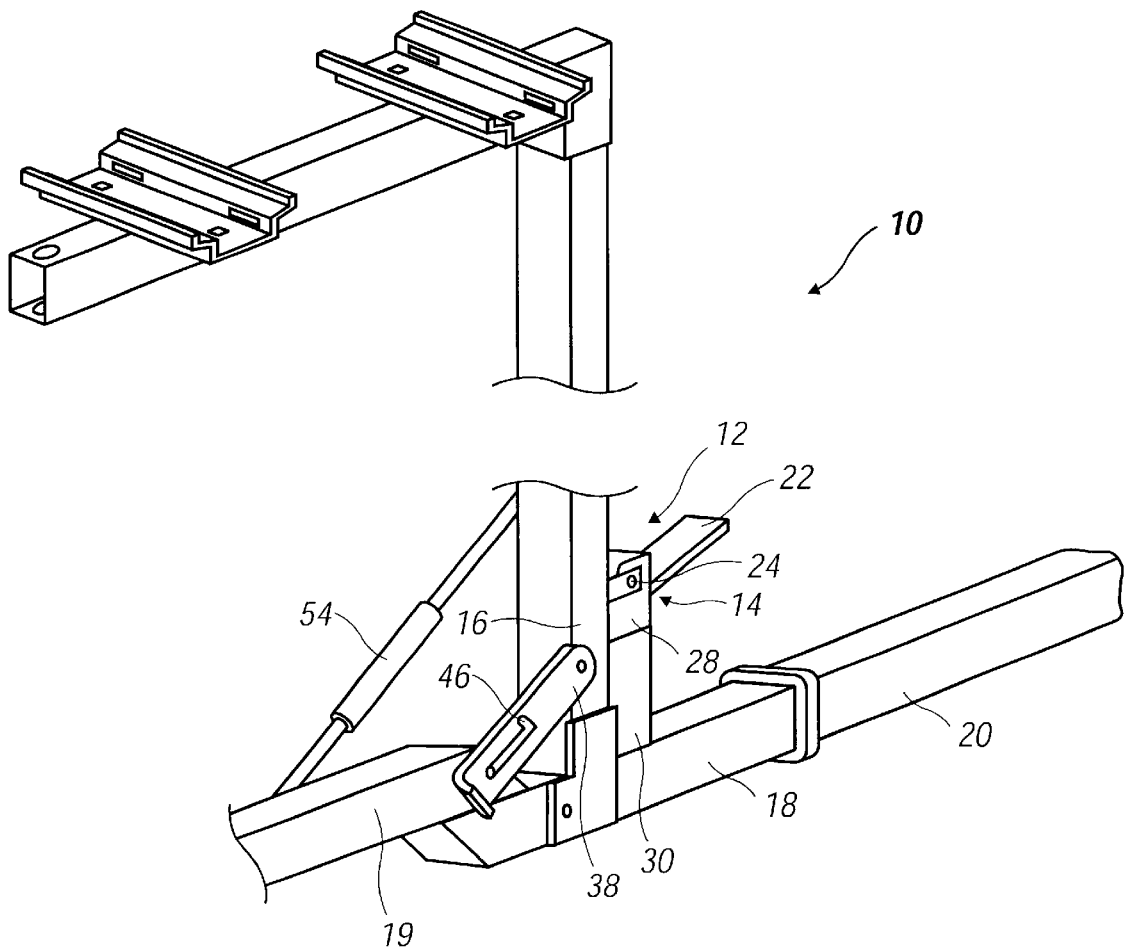
FIG. 6 is a perspective view showing the latching hitch mount carrier of the invention including a biasing member to urge the carrier towards a latched configuration.

A preferred embodiment of the load carrier frame 10 includes a biasing member 54 between the support tube 16 and the extension tube 19 to urge the support tube 16 toward the upright extension post 30. This provides a safety feature when there is equipment loaded on the load carrier frame 10. In FIG. 6, the bias member 54 appears as a gas strut that operates against the extension tube 19 to hold the support tube 16 adjacent to the extension post 30 so that the lock pin 24 resides in the slot 32. To withdraw the lock pin 24 from the slot 32, with the latch 22 open, a user needs to exert force against the gas strut 54 while separating the support tube 16 from the extension post 30. The amount of force required to separate the parts 16,30 will differ depending on the amount of equipment loaded on the load carrier frame 10. The weight of a fully loaded carrier frame 16 will assist in the process of separation. At the same time the gas pressure of the gas strut 54 will support the weight of equipment during safe release of the support tube 16 from the extension post 30. Regardless of the force required to move the support tube 16, it may need to be held against the pressure of the gas strut 54 to allow seating of the guide post 42 in the retention slot 46. This condition may also require manual positioning of the connecting arm 38.

In view of features previously described, a coupling 12 constructed according to the present invention is conveniently utilized for providing stable attachment of a sports equipment carrier frame 10 to a mounting stinger 18 held in a receiving-type hitch 20 of a transporting vehicle by the repositioning of a single latch 22. Such a simple procedure provides a clear improvement over traditional hitch mounts that must be bolted together utilizing several bolts, and also which have no provision for either retracting or tilting the support arm 16 out of the operators way and providing access to storage areas of the transporting vehicle or releasably locking the upright support arm 16 securely to the stationary base or extension post 30 of the load carrier 10.

Figure 4:
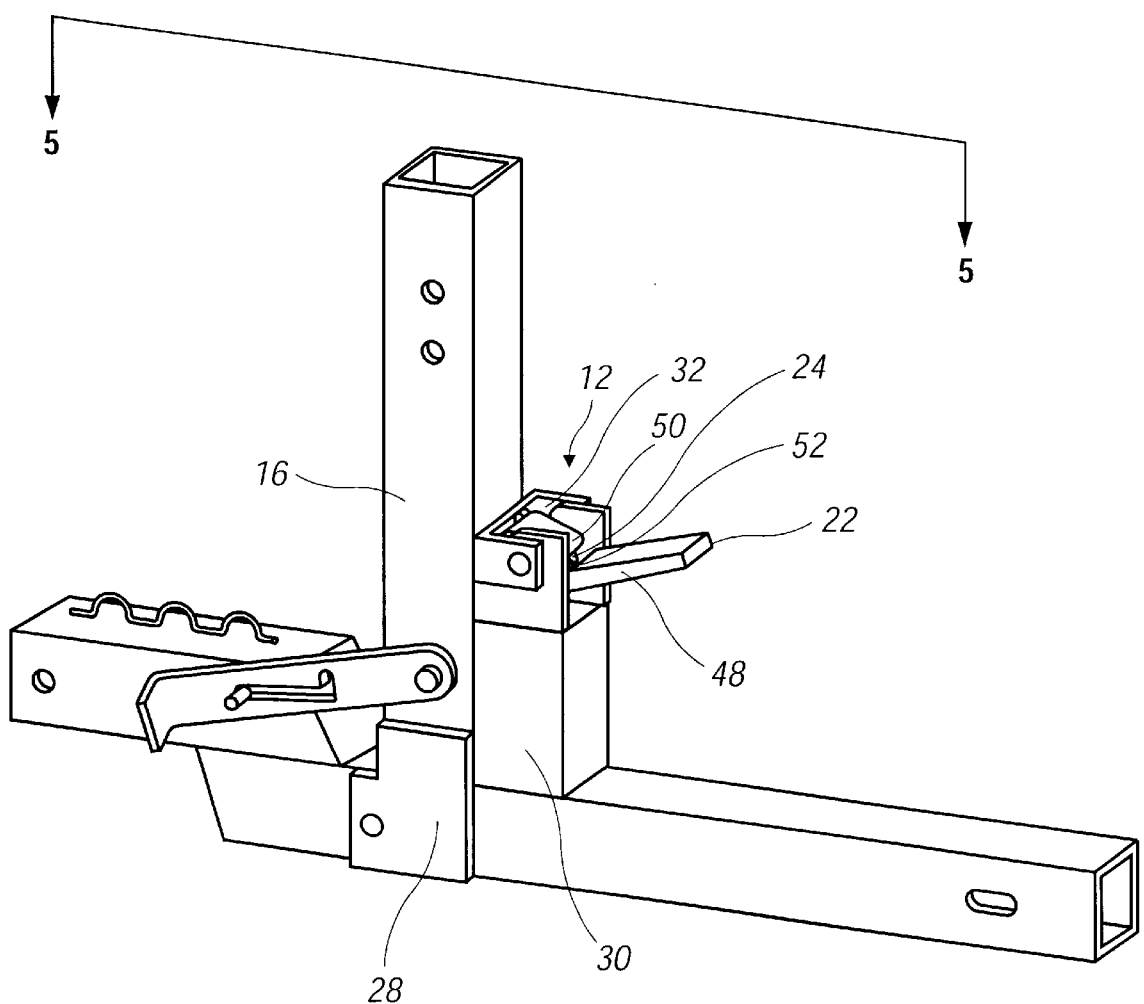
FIG. 4 is a perspective view showing detail of the mechanism of a latching hitch mount of the invention.

FIG. 4, is a perspective view having the coupling 12 positioned to show additional detail of the mechanism used to secure the support tube 16 to the latching assembly 14. In this view, the latch 22 is in its closed condition with the arm 48 of the latch 22 raised to place a thickened pad 50 of the latch 22 proximate the lock pin 24 to block any movement of the lock pin 24 that would result in its movement out of the slot(s) 32 formed in the sidewall(s) 28 of the base 30. The pad 50 lies adjacent a groove 52 formed in the latch 22 to capture the lock pin 24 to further restrict movement of the lock pin 24 in the slot 32.

Figure 5A:
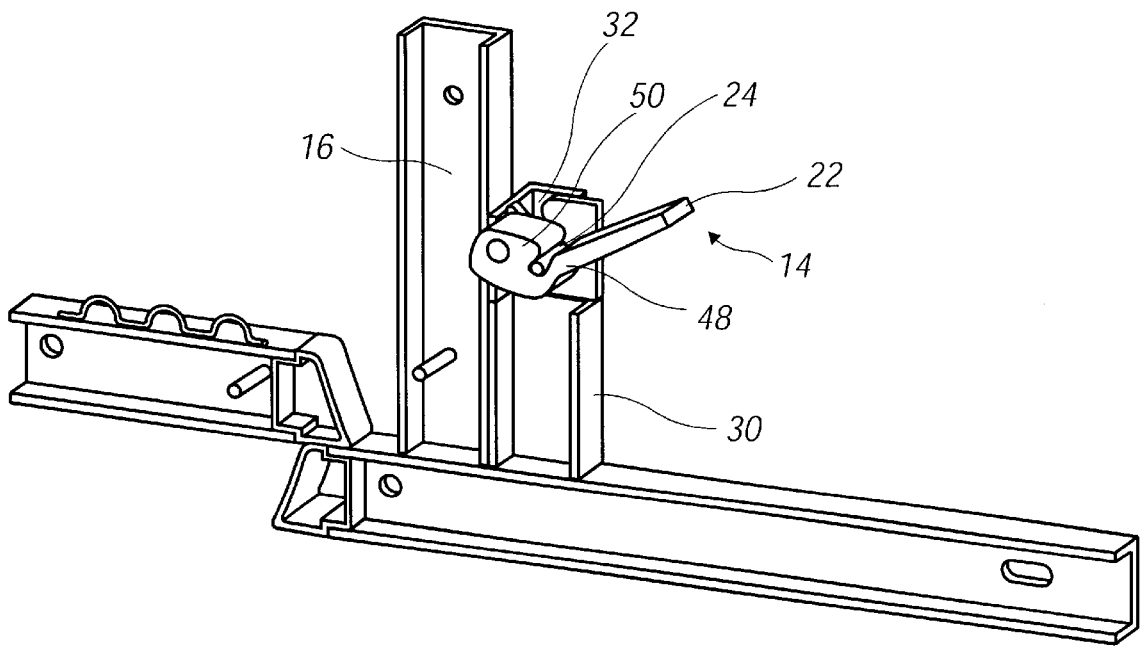
FIG. 5a shows a cross sectional view of a latching hitch mount of the invention viewed from line 5—5 of FIG. 4, with the latch in its closed position.
Figure 5B:
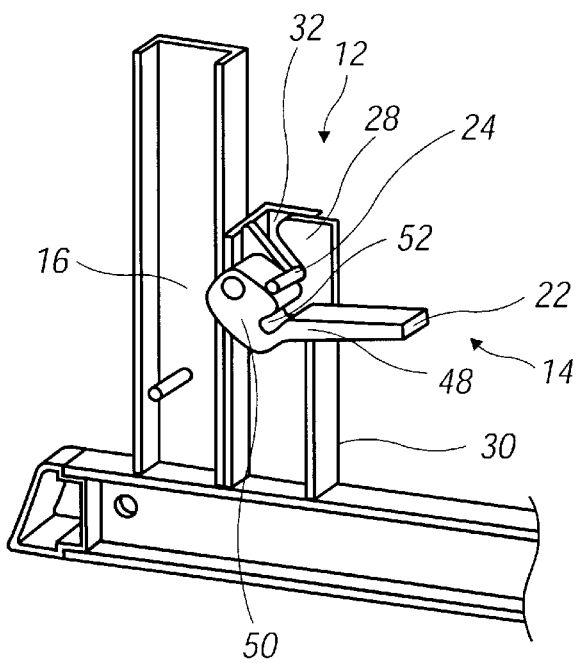
FIG. 5b provides a cross sectional view of a latching hitch mount of the invention taken from line 5—5 of FIG. 4, with the latch in its open position.

FIGS. 5a and 5b are cross sectional views taken along line 5—5 of FIG. 4, with primary emphasis on the difference between the closed and open condition of the latch 22 used to secure the support tube 16 to the upright extension or post 30 of the carrier. In FIG. 5a, the positioning of the latch 22 sets the pad 50 to block release of the lock pin 24 from the slot 32, while the groove 52 lies positioned on either side of the lock pin 24 to restrict its movement in the slot 32. With the latching mechanism in this configuration, the arm 48 of the latch 22 adopts its highest position. Conversely, in the open condition as shown in FIG. 5b, the arm 48 of the latch 22 adopts its lowest position to set the lock pin 24 free of the groove 52 and, at the same time, re-position the latch pad 50 so that it no longer impedes release of the lock pin 24 from the slot 32 in the sidewall 28. In at least one embodiment, the latch pad 50 forms a camming surface that progressively advances upon the lock pin 24 thereby securing that pin 24 deeply within the slot at the back, closed end thereof.

A coupling for a sports rack carrier, including a unique latching arrangement and its components have been described herein. These and other variations, which will be appreciated by those skilled in the art, are within the intended scope of this invention as claimed below. As previously stated, detailed embodiments of the present invention are disclosed herein; however, it is to be understood that the disclosed embodiments are merely exemplary of the invention that may be embodied in various forms.

INDUSTRIAL APPLICABILITY

The present invention finds applicability in the load carrier industries, and especially in the sport rack industry.

What is claimed and desired to be secured by Letters Patent is as follows:

1. A coupling for attaching a carrier frame to a mounting stinger received in a receiving type hitch, said coupling comprising:

a hitch mount having a base and a sidewall, said sidewall having a slot formed therein and an edge, said slot having an open end at said edge, said base securely held to said mounting stinger;

a support tube having a bracket attached thereto, said bracket including a lock pin to slidably engage said slot in said sidewall to couple said support tube to said hitch mount; and a latch pivotally mounted adjacent said sidewall, said latch having an open position to allow said lock pin to enter said open end of said slot at said edge of said sidewall, said latch further having a closed position to prevent release of said lock pin from said slot, said coupling formed between said hitch mount and said support tube with said lock pin in said slot and said latch in said closed position.

2. The coupling of claim 1, further comprising a groove in the latch and adapted for receiving the lock pin.

3. The coupling of claim 2, further comprising a pad adjacent to the groove and adapted to capture the lock pin when the latch is in the closed position.

4. The coupling of claim 1 further comprising a biasing member attached to an extension tube at a first end of the biasing member and to the support tube at a second end of the biasing member, the biasing member operating against the extension tube thereby biasing the support tube towards the base.

5. The coupling of claim 4 wherein the biasing member is a gas strut.

6. The coupling of claim 4 further comprising a connecting arm connecting the extension tube with the support tube.

7. The coupling of claim 6 further comprising a channel in the connecting arm, the channel including a retention slot configured for releaseably locking on a guide post on the support tube thereby providing a locking the support tube when the latch is in the open position.

* * * * *